(12) United States Patent
Liao et al.

(10) Patent No.: US 6,587,614 B2
(45) Date of Patent: Jul. 1, 2003

(54) OPTICAL SWITCH

(75) Inventors: Shang-Chin Liao, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/033,552

(22) Filed: Dec. 27, 2001

(65) Prior Publication Data

US 2003/0086640 A1 May 8, 2003

(30) Foreign Application Priority Data

Nov. 2, 2001 (TW) .................... 90218791 U

(51) Int. Cl.[7] .................... G02B 26/08; G02B 6/35
(52) U.S. Cl. .................... 385/18; 385/19
(58) Field of Search .................... 385/15–19

(56) References Cited

U.S. PATENT DOCUMENTS

| | | | | |
|---|---|---|---|---|
| 5,000,534 A | * | 3/1991 | Watanabe et al. | 385/18 |
| 5,436,986 A | * | 7/1995 | Tsai | 385/16 |
| 5,999,669 A | * | 12/1999 | Pan et al. | 385/18 |
| 6,256,430 B1 | * | 7/2001 | Jin et al. | 385/18 |
| 6,400,858 B1 | * | 6/2002 | Laor | 385/18 |

* cited by examiner

*Primary Examiner*—Akm E. Ullah
*Assistant Examiner*—Jerry T Rahll
(74) *Attorney, Agent, or Firm*—Wei Te Chung

(57) ABSTRACT

An optical switch (80) includes a base (11), two input ports (20, 40), two output ports (30, 50), a reflector assembly (60), a driving means (70) and a cover (12). The reflector assembly has a first reflector (61) with two reflecting surfaces (611, 612) and a second reflector (62) with two reflecting surfaces (621, 622). The light beams from the input ports selectively propagate to the output ports by controlling the rotation angle (90° or N×90°; N: natural number) of the reflector assembly to be in a first position or a second position and therefore to switch different reflecting surface of the first reflector and the second reflector into the path of the light beams.

16 Claims, 4 Drawing Sheets

OPTICAL SWITCH

BACKGROUND OF THE INVENTION

1. Field of the Invention

The present invention relates to an optical switch for use in optical fiber communication and optical network technology, and particularly to an optical switch having four reflecting surfaces to control the path of a light beam.

2. Description of Related Art

Optical signals are commonly transmitted in optical fibers, which provide efficient light channels through which the optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

A typical switch has one or more light input port(s) and at least two light output ports for performing switching or logical operations to optical signals in a light transmitting line/system or in an integrated optical circuit. Factors for assessing the capability of an optical switch include low insertion loss (IL<1 db), good isolation performance (>50 db), and fast switching speed (normally, tens of milliseconds).

Optical switches are divided into two types: a mechanical type and a non-mechanical type. In principle, the mechanical-type optical switches have a number of advantages over other forms of optical switches in applications where switching speed is not critical. Mechanical-type optical switches offer lower insertion losses, low cross-talk, and insensitivity to wavelength of light.

Conventional mechanical-type optical switches come in two different designs: where the optical components move, and where the fibers move. Moving fiber switches involve the actual physical movement of one or more of the fibers to specific positions to accomplish the transmission of a beam of light from one fiber end to another fiber end under selected switching conditions. Moving optical component switches, on the other hand, include optical collimating lenses, which expand the beam of light from the fibers, and then, using moving prisms or mirrors, redirect the expanded beam as required by the switching process.

The moving fiber switches have a stringent tolerance requirement for the amount and direction of fiber movement. The tolerance is typically a small portion of the fiber core diameter for two fibers to precisely collimate to reduce loss. The fibers themselves are quite thin and may be subject to breakage if not properly protected. On the other hand, reinforcing the fibers with stiff protective sheaths makes the fibers less flexible, increasing the force required to manipulate each fiber into alignment. Thus these moving fiber optical switches share a common problem of requiring high precision parts to obtain precise positioning control and low insertion loss. This results in high costs and complicates manufacture of the switches. Moreover, frequently moving fibers to and fro is apt to damage or even break the fibers. The switching speed of these moving fiber optical switches is also slow.

Conventional moving optical component switches have less stringent movement control tolerance requirements because of the collimating lenses.

One prior art moving optical component switch, as disclosed in U.S. Pat. No. 5,436,986 and shown in FIG. 5, comprises a first and a second input fibers 101, 103, a first and a second output fibers 102, 104, and a driving device 304 and a movable reflector assembly 200. The movable reflector assembly 200 includes a movable block 203 and two reflectors 201, 202 assembled on the block 203. Each reflector has two reflecting surfaces for reflecting light beams from the input fibers 101, 103. The driving device 304 drives the movable reflector assembly 200 to move between a first position and a second position. When the movable reflector assembly 200 is displaced in the first position, light beams from the first and second input fibers 101, 103 are directly transmitted to the first and second output fibers 104, 102. When the movable reflector assembly 200 is displaced in the second position, the reflector 201 reflects off the light beams from the first input fiber 101 to the reflector 202, and the reflector 202 then reflects off the light beams to the second output fiber 102; the reflector 202 reflects off the light beams from the second input fiber 103 to the reflector 201, and then the reflector 201 reflects off the light beams to the first output fiber 104.

In this mechanical optical switch, the light beams are reflected two times, which increases the insertion loss. Furthermore, each reflector has two reflecting surfaces fixed thereon for reflecting light beams from different input fibers, and four reflecting surfaces of the movable reflector assembly 200 are at the path of the light beams at the same time, so it is very difficult to adjust the positions of the fibers and the reflecting surfaces for precisely collimating light beams from the input fibers 101, 103 to the corresponding output fibers 102, 104.

For the above reasons, an improved optical switch which has high optical efficiency, is easy to align and does not require movement of the optical fibers themselves is desired.

SUMMARY OF THE INVENTION

An object of the present invention is to provide an optical switch which is easy to adjust and has a low insertion loss.

Another object of the present invention is to provide an optical switch which uses four reflecting surfaces as a switching element.

In accordance with one aspect of the present invention, an optical switch comprises two input ports, two output ports and a reflector assembly. The reflector assembly includes a first reflector and a second reflector and rotates between a first position and a second position. The first reflector includes two reflecting surfaces paralleled to each other, and the second reflector also includes two reflecting surfaces paralleled to each other. When the reflector assembly is in the first position, one reflecting surface of the first reflector and one reflecting surface of the second reflector are in the path of the light beams, the light beams from the first input port are reflected by the one reflecting surface of the first reflector and enter the first output port, while the light beams from the second input port are reflected by the one reflecting surface of the second reflector and enter the second output port. When the reflector assembly is in the second position, the other reflecting surface of the first reflector and the other reflecting surface of the second reflector are in the path of the light beams, the light beams from the first input port are reflected by the other reflecting surface of the first reflector and enter the second output port, while the light beams from the second input port are reflected by the other reflecting surface of the second reflector and enter the first output port. An efficient switching operation is thus achieved.

The feature of the present invention is that the light beams from the input ports to the output ports are reflected only once and the insertion loss and the difficulty of adjustment reduce.

DETAILED DESCRIPTION OF THE INVENTION

Figure 1:
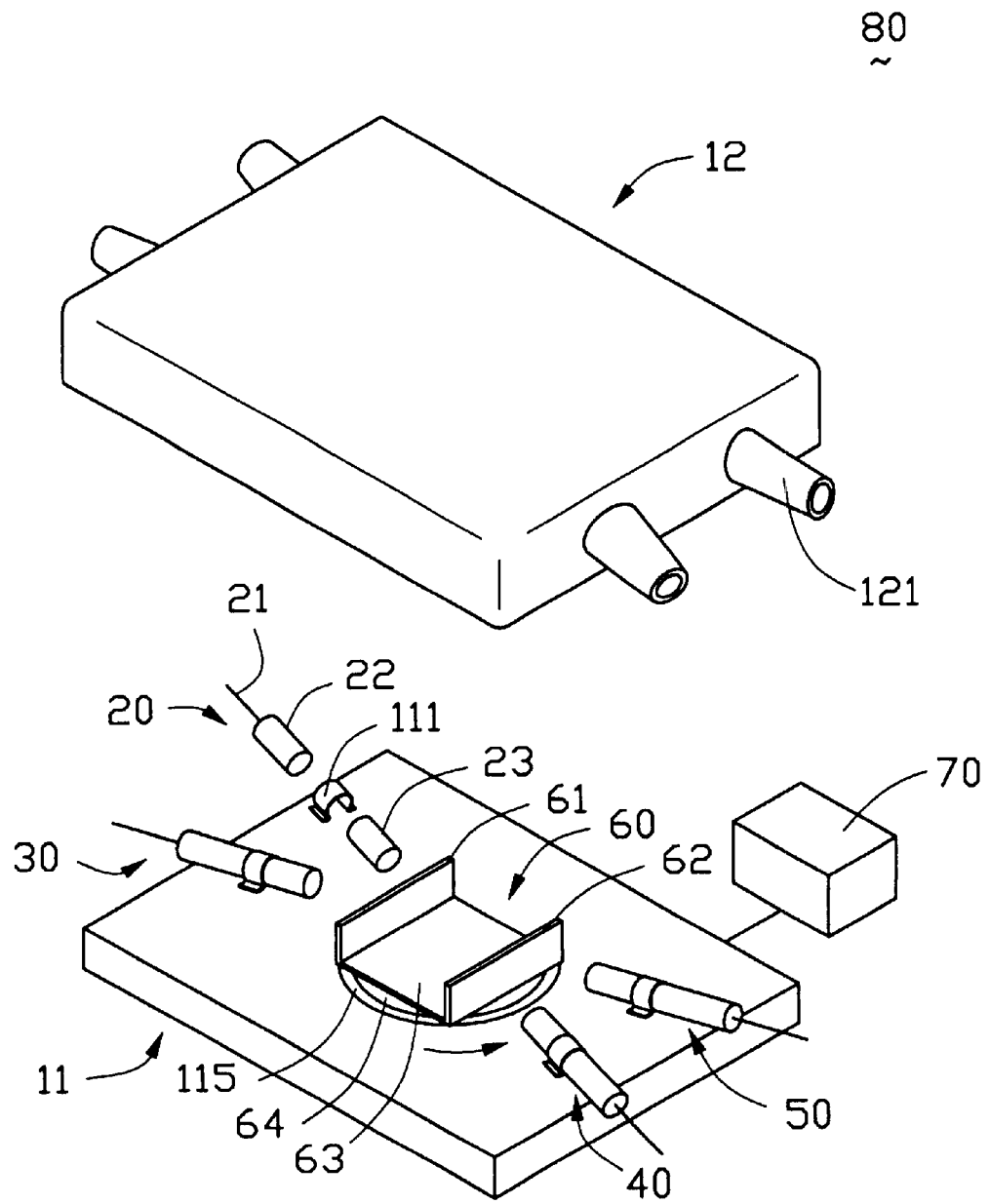
FIG. 1 is a perspective view of an optical switch in accordance with the present invention in a first position.
Figure 2:
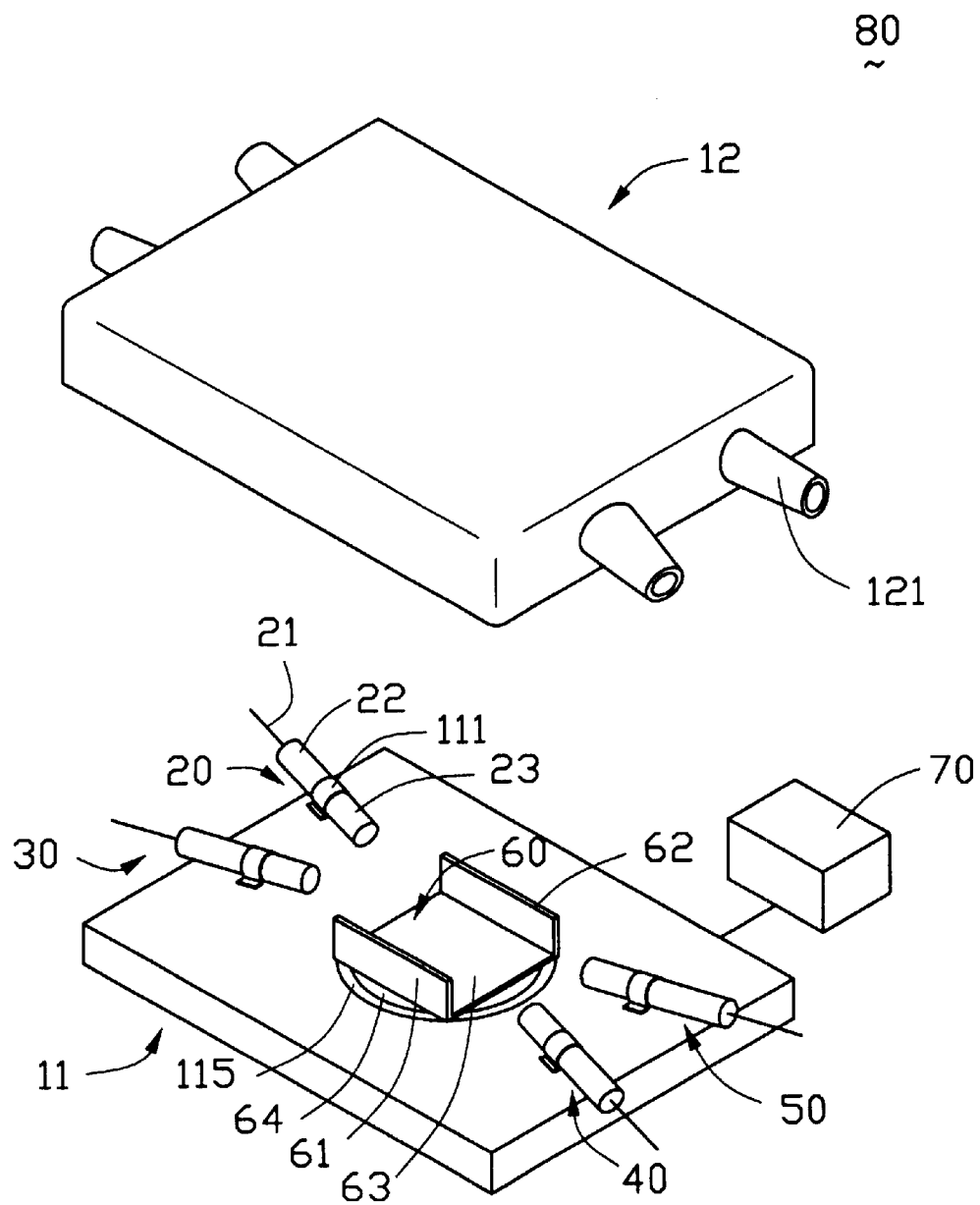
FIG. 2 is a perspective view of the optical switch in a second position.

As shown in FIGS. 1 and 2, an optical switch 80 in accordance with the present invention comprises a base 11 and a cover 12, a first input port 20, a first output port 30, a second input port 40, a second output port 50, a reflector assembly 60 and a driving means 70.

The first input port 20, the first output port 30, the second input port 40 and the second output port 50 are all similar to each other. The first input port 20 comprises a fiber 21, a ferrule 22 and an optical collimating lens, which in the present embodiment is a quarter pitch GRIN lens 23. The fiber 21 is received and retained in the ferrule 22, and an end face (not labeled) of the ferrule 22 is fixed in close proximity to a corresponding face (not labeled) of the quarter pitch GRIN lens 23.

Figure 3:
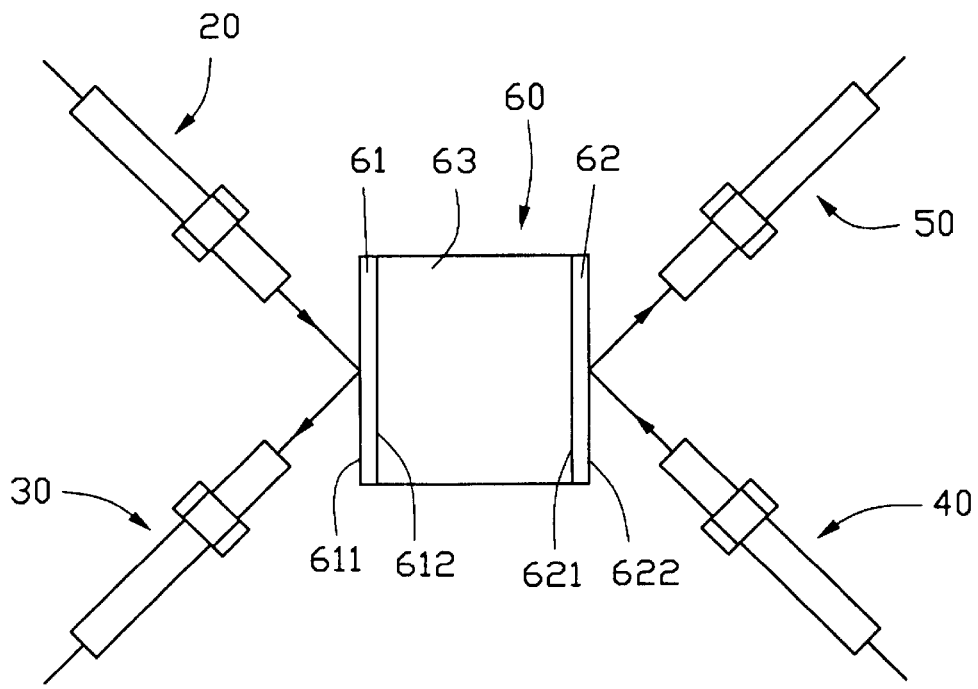
FIG. 3 is an optical path diagram of the optical switch in FIG. 1 in the first position.

The reflector assembly 60 includes a first reflector 61, a second reflector 62, and a block 63 which rotates between a first position and a second position. The first reflector 61 and the second reflector 62 are oppositely attached to the block 63. In the preferred embodiment, each reflector is a two-sided reflector with two reflecting surfaces paralleling to each other. As seen in FIG. 3, the first reflector 61 comprises a first reflecting surface 611 and a second reflecting surface 612. And the second reflector 62 comprises a third reflecting surface 621 and a fourth reflecting surface 622. The first reflecting surface 611 is parallel to the fourth reflecting surface 622, the second reflecting surface 612 confronts and is parallel to the third reflecting surface 621. The four reflecting surfaces 611, 612, 621, 622 are formed by coating with high reflectivity material (such as silver or gold) on the reflectors 61, 62.

The driving means 70 is realized by means of a motor or a relay, and comprises a rotatable platform 64 carrying the block 63.

The base 11 mounts a holding element 111 for fixing the input and output ports 20, 30, 40, 50 and a groove 115 for accommodating the rotatable platform 64.

The cover 12 has four lead sections 121 for protecting the corresponding fibers of the ports 20, 30, 40, 50.

In assembly, the base 11 and the cover 12 define an interior space therebetween for accommodating and mounting the input and output ports 20, 30, 40, 50, the reflector assembly 60 and the rotatable platform 64 therein.

As shown in FIG. 1, the optical switch 80 is positioned in the first position where the first reflecting surface 611 and the fourth reflecting surface 622 of the reflector assembly 60 block the paths of the light beams and respectively confront with the first input port 20 and the second input port 40, while the second reflecting surface 612 and the third reflecting surface 621 are inactive or out of the paths of the light beams. FIG. 3 shows the optical paths of the optical switch 80 with the reflector assembly 60 in the first position, light beams from the first input port 20 hit the first reflecting surface 611 of the first reflector 61, whereupon they are reflected into the first output port 30. At the same time, the light beams from the second input port 40 hit the fourth reflecting surface 622 of the second reflector 62, whereupon they are reflected into the second output port 50.

Figure 4:
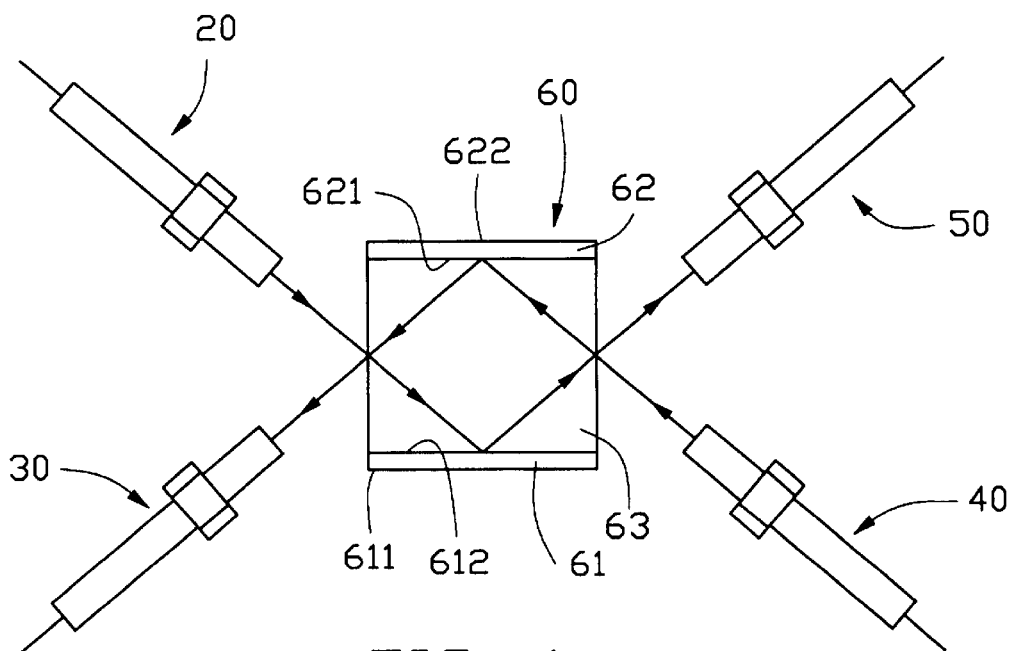
FIG. 4 is an optical path diagram of the optical switch in FIG. 2 in the second position.
Figure 5:
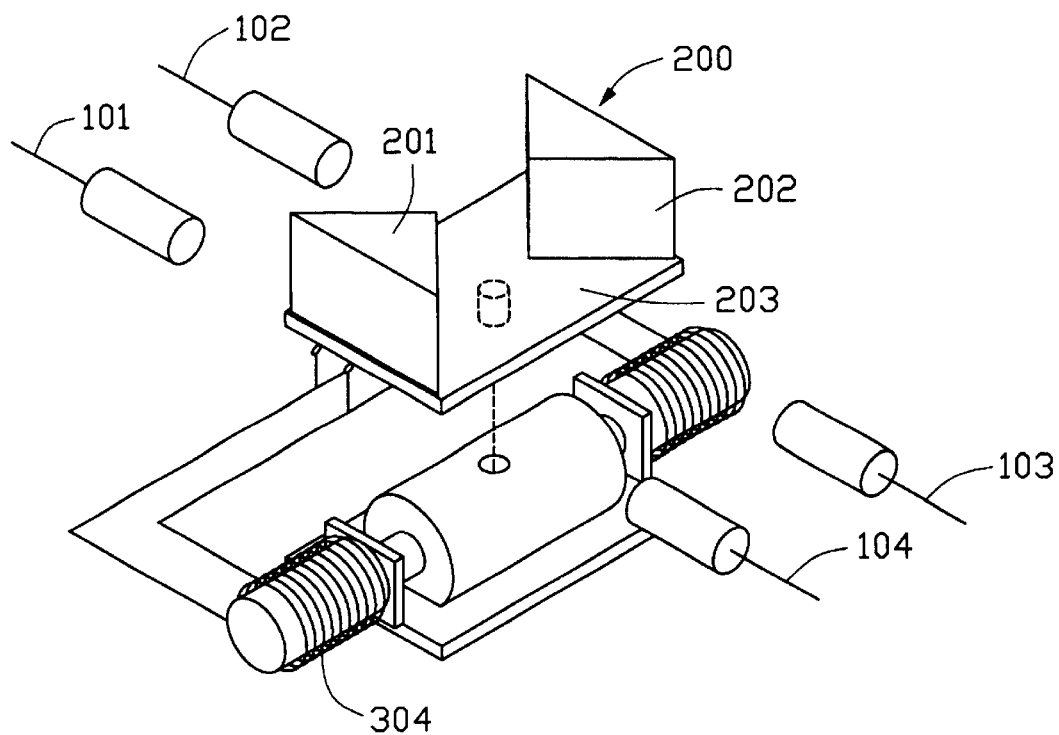
FIG. 5 is a perspective view of a conventional optical switch.

In FIG. 2, the optical switch 80 is in the second position, after the rotatable platform 64 and therefore the block 63 have rotated 90°, and the second reflecting surface 612 and the third reflecting surface 621 block the paths of the light beams and respectively confront with the first input port 20 and the second input port 40, while the first reflecting surface 611 and the fourth reflecting surface 622 are out of the paths of the light beams. FIG. 4 shows the optical paths of the optical switch 80 with the reflector assembly 60 in the second position. The light beams from the first input port 20 hit the second reflecting surface 612 of the first reflector 61, whereupon they are reflected into the second output port 50. At the same time, the light beams from the second input port 40 hit the third reflecting surface 621 of the second reflector 62, whereupon they are reflected into the first output port 30. The above 90° rotation can be measured either clockwise or counter-clockwise from the first position. The same purpose is achieved while the light beams from the first input port 20 are reflected by the third reflecting surface 621 of the second reflector 62 and propagate to the second output port 50, and the light beams from the second input port 40 are reflected by the second reflecting surface 612 of the first reflector 61 and propagate to the first output port 30.

Consequently, by controlling the rotation angle (9° or N×90°; N: natural number) of the reflector assembly 60 using the driving means 70, the light beams emitted from the input ports 20, 40 can be selectively switched between the output ports 30, 50. Transmission of the optical signals through the optical switch 80 is efficient as to low insertion loss and good isolation performance, since the optical signals from the input port 20, 40 are reflected off by the reflector assembly 60 only once and propagates to the output ports 30, 50 in the first position or in the second position. Furthermore, if the first input port 20, the first output port 30, the second input port 40 and the second output port 50 are symmetrical about the reflector assembly 60, then a distance that a first set of optical signals travels from the first input port 20 to the output port 30 or 50 will be substantially equal to a distance that a second set of optical signals travels from the second input port 40 to the output port 50 or 30. Thus there should be no phase shift between the optical signals arriving at the first output port 30 and those arriving at the second output port 50. With very high speed communications, this can provide an added advantage.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, four mirrors can be used for replacing the two reflectors 61, 62 as the switching element.

What is claimed is:

1. An optical switch for switching light beams coming from a first and a second input ports between a first and a second output ports, comprising:
   a base;
   a first input port, a second input port, a first output port and a second output port all supported by the base; and
   a reflector assembly mounted to the base, the reflector assembly comprising a first reflector and a second reflector and be rotatable with respect to the base between a first position and a second position;
   wherein, in the first position, the light beams propagate from the first input port to the first output port after being reflected by the first reflector and the light beams propagate from the second input port to the second output port after being reflected by the second reflector, and wherein, in the second position, the light beams propagate from the first input port to the second output port after being reflected by the first reflector and the light beams from the second input port propagate to the first output port after being reflected by the second reflector.

2. The optical switch as claimed in claim 1, wherein the first input and output ports and the second input and output ports are symmetrically arranged about the reflector assembly.

3. The optical switch as claimed in claim 1, wherein the first reflector is constituted by a first mirror and a second mirror paralleled to each other and the second reflector is constituted by a third mirror and a fourth mirror paralleled to each other.

4. The optical switch as claimed in claim 3, wherein the first mirror is parallel to the fourth mirror, and the second mirror confronts and is parallel to the third mirror.

5. The optical switch as claimed in claim 1, wherein the first reflector comprises a first reflecting surface and a second reflecting surface, the second reflector comprises a third reflecting surface and a fourth reflecting surface.

6. The optical switch as claimed in claim 5, wherein the first reflecting surface is parallel to the fourth reflecting surface, and the second reflecting surface confronts and is parallel to the third reflecting surface.

7. The optical switch as claimed in claim 5, wherein in the first position, the light beams from the first input port are reflected by the first reflecting surface and propagate to the first output port and the light beam from the second input port are reflected by the fourth reflecting surface and propagate to the second output port.

8. The optical switch as claimed in claim 5, wherein in the second position, the light beams from the first input port are reflected by the second reflecting surface and propagate to the second output port and the light beams from the second input port are reflected by the third reflecting surface and propagate to the first output port.

9. The optical switch as claimed in claim 1, wherein the reflector assembly comprises a block for attaching the two reflectors.

10. The optical switch as claimed in claim 9, wherein the first reflector attaches at one end of the block, and the second reflector attaches at the opposite end of the block.

11. The optical switch as claimed in claim 1, further comprising a driving means for rotating the reflector assembly from the first position to the second position.

12. The optical switch as claimed in claim 11, wherein the driving means comprises a rotatable platform for attaching the block and rotating the reflector assembly.

13. The optical switch as claimed in claim 1, wherein the base mounts a groove for accommodating the rotatable platform.

14. An optical switch assembly comprising:
   first input and output ports angled to each other on one side of a reflector assembly;
   second input and output ports angled to each other on the other side of said reflector assembly; and
   said reflector assembly defining first and second sets of reflection surfaces; wherein
      when said first set of reflection surfaces is provided, light from the first input port leaves via said first output port and light from the second input port leaves via said second output port while when said second set of reflection surfaces is provided, light from the first input port leaves via the second output port and light from the second input port leaves via the first input port under a condition that for the same light source, the first set of reflection surfaces interrupts a corresponding light path in an earlier stage than said second set of reflection surfaces.

15. The assembly as claimed in claim 14, wherein said first set of reflection surfaces and said second set of reflection surfaces are perpendicular to each other.

16. The assembly as claimed in claim 14, wherein said first set of reflection surfaces reflect corresponding light for not allowing the light to penetrate a boundary of the reflector assembly defined by said first and second sets of reflection surfaces while said second set of reflection surfaces reflect corresponding light after said light invades internal territory of said reflector assembly defined by said first and second sets of reflection surfaces.

* * * * *